(12) United States Patent
Wiswell et al.

(10) Patent No.: US 12,403,560 B2
(45) Date of Patent: Sep. 2, 2025

(54) DETERMINING SUBSTRATE PRECESSION WITH ACOUSTIC SIGNALS

(71) Applicant: Applied Materials, Inc., Santa Clara, CA (US)

(72) Inventors: Nicholas A. Wiswell, Sunnyvale, CA (US); Benjamin Cherian, San Jose, CA (US); Jun Qian, Sunnyvale, CA (US); Thomas H. Osterheld, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 323 days.

(21) Appl. No.: 17/963,143

(22) Filed: Oct. 10, 2022

(65) Prior Publication Data

US 2023/0390885 A1 Dec. 7, 2023

Related U.S. Application Data

(60) Provisional application No. 63/349,020, filed on Jun. 3, 2022.

(51) Int. Cl.
*B24B 37/005* (2012.01)
*B24B 37/04* (2012.01)
*B24B 49/00* (2012.01)

(52) U.S. Cl.
CPC .......... *B24B 37/005* (2013.01); *B24B 37/042* (2013.01); *B24B 49/003* (2013.01)

(58) Field of Classification Search
CPC ....... B24B 7/228; B24B 37/005; B24B 37/04; B24B 37/042; B24B 37/10; B24B 37/105; B24B 37/107; B24B 49/003; B24B 49/006; B24B 49/04; B24B 49/045

USPC ............................................. 451/5, 9, 10, 11
See application file for complete search history.

(56) References Cited

U.S. PATENT DOCUMENTS

| | | | |
|---|---|---|---|
| 4,604,834 A | * | 8/1986 | Thompson ......... B23Q 17/0976 409/141 |
| 10,850,363 B2 | | 12/2020 | Matsui et al. |
| 2003/0073384 A1 | | 4/2003 | Sandhu et al. |
| 2013/0260646 A1 | | 10/2013 | Lischka et al. |
| 2014/0020829 A1 | | 1/2014 | Chen et al. |

(Continued)

FOREIGN PATENT DOCUMENTS

| | | |
|---|---|---|
| CN | 105164794 | 12/2015 |
| JP | 2017-163100 | 9/2017 |

(Continued)

OTHER PUBLICATIONS

Office Action in Taiwanese Appln. No. 111138346, dated Oct. 6, 2023, 5 pages (with English search report).

*Primary Examiner* — C. A. Rivera
(74) *Attorney, Agent, or Firm* — Fish & Richardson P.C.

(57) ABSTRACT

A chemical mechanical polishing apparatus includes a platen to support a polishing pad, a carrier head to hold a surface of a substrate against the polishing pad, a motor to generate relative motion between the platen and the carrier head so as to polish an overlying layer on the substrate, an in-situ acoustic monitoring system comprising an acoustic sensor that receives acoustic signals from the surface of the substrate, and a controller configured to determine an angular orientation of the substrate based on received acoustic signals from the in-situ acoustic monitoring system.

12 Claims, 6 Drawing Sheets

(56) References Cited

U.S. PATENT DOCUMENTS

| | | |
|---|---|---|
| 2014/0032943 A1 | 1/2014 | Goel |
| 2014/0242883 A1 | 8/2014 | Cherian et al. |
| 2016/0256978 A1 | 9/2016 | Tang et al. |
| 2021/0066142 A1* | 3/2021 | Lau ........................ B25J 9/1628 |
| 2021/0402547 A1* | 12/2021 | Brown .................... B24B 37/10 |
| 2022/0283554 A1* | 9/2022 | Lau ....................... B24B 49/006 |

FOREIGN PATENT DOCUMENTS

| | | |
|---|---|---|
| TW | 201641216 | 12/2016 |
| WO | WO 2005/100976 | 10/2005 |

\* cited by examiner

DETERMINING SUBSTRATE PRECESSION WITH ACOUSTIC SIGNALS

CROSS-REFERENCE TO RELATED APPLICATIONS

This application claims the benefit of priority to U.S. Application No. 63/349,020, filed on Jun. 3, 2022, the contents of which are hereby incorporated by reference.

FIELD OF THE DISCLOSURE

This disclosure relates to in-situ monitoring of chemical mechanical polishing, and in particular to acoustic monitoring.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the metallic layer remaining between the raised pattern of the insulative layer form vias, plugs, and lines that provide conductive paths between thin film circuits on the substrate. For other applications, such as oxide polishing, the filler layer is planarized, e.g., by polishing for a predetermined time period, to leave a portion of the filler layer over the nonplanar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

During polishing, a substrate can be subjected to an "asymmetric" removal profile, i.e., the amount removed varies with the angular position around the center of the substrate (rather than only with the radial distance from the center of the substrate). Also, prior to being polished, the substrate can have an initial asymmetrically non-uniform thickness profile.

SUMMARY

Disclosed herein is a chemical mechanical polishing apparatus including an in-situ acoustic monitoring system arranged in a platen. The carrier head induces motion between the substrate and the polishing pad atop the platen. The acoustic monitoring system receives acoustic signals as the substrate is swept over the acoustic sensor. The acoustic signals originate from the interface between the substrate surface and the polishing pad and vary with time according to the polishing stage and material exposed on the substrate surface. In some stages, the acoustic signals vary periodically according to the substrate angular orientation with respect to the acoustic sensor. Detecting this periodic variation facilitates determination of the angular orientation of the substrate within the carrier head. The substrate angular orientation can be determined as a function of time, and predicted angular orientations generated for any time point from the initiation of polishing.

In one aspect, a chemical mechanical polishing apparatus includes a platen to support a polishing pad, a carrier head to hold a surface of a substrate against the polishing pad, a motor to generate relative motion between the platen and the carrier head so as to polish an overlying layer on the substrate, an in-situ acoustic monitoring system comprising an acoustic sensor that receives acoustic signals from the surface of the substrate, and a controller configured to determine a angular orientation of the substrate based on received acoustic signals from the in-situ acoustic monitoring system.

In another aspect, a method includes bringing a substrate into contact with a polishing pad, generating relative motion between the substrate and the polishing pad to polish an overlying layer on the substrate, monitoring acoustic signals from the surface of the substrate with an acoustic sensor, and determining an angular orientation of the substrate based on the monitored acoustic signals.

In another aspect, a chemical mechanical polishing system includes a transfer station having a sensor that generates a signal that depends on an angular orientation of the substrate, a polishing station a platen to support a polishing pad, a carrier head to hold a surface of the substrate against the polishing pad, a motor to generate relative motion between the platen and the carrier head so as to polish an overlying layer on the substrate, an in-situ acoustic monitoring system comprising an acoustic sensor that receives acoustic signals from the surface of the substrate, and a controller. The controller is configured to receive a signal from the sensor in the transfer station and determine an initial angular orientation of the substrate before polishing based on the signal, to determine a rate of change of angular orientation of the substrate based on received acoustic signals from the in-situ acoustic monitoring system, and to determine an angular orientation of the substrate from the initial angular orientation and the rate of change.

In another aspect, a chemical mechanical polishing system includes polishing station having a platen to support a polishing pad, a rotatable carrier head to hold a surface of a substrate against the polishing pad, a motor to generate relative motion between the platen and the carrier head so as to polish an overlying layer on the substrate, an in-situ acoustic monitoring system comprising an acoustic sensor that receives acoustic signals from the surface of the substrate, and a controller. The controller is configured to determine a rate of change of angular orientation of the substrate based on received acoustic signals from the in-situ acoustic monitoring system, to obtain a rotation rate of the carrier head, and to determine a difference in angular orientation between the substrate and the carrier head based on the rate of change of angular orientation of the substrate and the rotation rate of the carrier head.

Implementations may include one or more of the following features. The acoustic sensor may be a passive acoustic sensor. The controller may be configured to determine an angular orientation of the substrate based on a signal from a notch detector in the carrier head and acoustic signals from the in-situ acoustic monitoring system.

Particular implementations of the subject matter described in this specification can be implemented so as to realize one or more of the following technical advantages.

Wafer-to-wafer (WTW) and within-wafer (WIW) polishing uniformity can be improved. Angularly dependent nonuniformity can be reduced. Software of existing acoustic monitoring systems can be updated to detect the angular orientation acoustic signals without requiring new hardware, which decreases cost of ownership. Determining a time-varying function representing the angular orientation of the substrate allows extrapolation of the angular orientation, which permits application of angularly dependent pressures to increase material removal accuracy.

The details of one or more embodiments are set forth in the accompanying drawings and the description below. Other features and advantages will be apparent from the description and drawings, and from the claims.

DESCRIPTION OF DRAWINGS

In the figures, like references indicate like elements.

DETAILED DESCRIPTION

As noted above, during polishing a substrate can be subjected to an asymmetric removal profile or can have an initial asymmetrically non-uniform thickness profile. Hypothetically a carrier head could include multiple chambers disposed angularly around a center axis, and different pressures could applied to the angularly disposed chambers to compensate for the asymmetry. However, a problem is that during polishing the substrate "precesses," i.e., rotates relative to the carrier head. Thus, how the chambers need to be pressurized to compensate for asymmetry will change over time (since a given chamber will not always correspond to the same angular position on the substrate). Consequently determination of the substrate orientation relative to the substrate would be useful in order to correctly determine polishing parameters to compensate for asymmetry.

A carrier head with optical sensors has been proposed to monitor the substrate orientation. However, such techniques have been difficult to implement, and in any event require a change in equipment. Thus, there is room for improvement in techniques to determine the orientation of the substrate within the carrier head (even if used for purposes other than compensating for asymmetry as discussed for above).

A technique that may be able to determine substrate orientation is acoustic monitoring. Without being limited to a theory, a device substrate, i.e., a substrate being used in integrated circuit device fabrication (as opposed to a blank substrate or bare silicon wafer), typically has patterned features. The patterned features can include small scale features such as the nanometer-scale plateaus and trenches and larger scale features such as circuitry dies aligned along regular arrays. Still without being limited to theory, as the substrate precesses (e.g., undergoes precession), these features can move into and out of alignment with the relative direction of travel of the asperities of the polishing layer of the polishing pad. This can result in a change in the acoustic signal.

In operation, the platen including the acoustic sensor rotates at a first speed to carry the sensor below the substrate at a sweep frequency, and the substrate rotates at a second speed. Measurements received each time the acoustic sensor sweeps beneath the substrate provide periodic measurements taken when the substrate is at varying rotational positions, e.g., at various orientations in the precession of the substrate beneath the carrier head. The sweep frequency and substrate rotational frequency create a periodic signal based on the beat frequency of the two rotation rates. The peaks or valleys of the periodic signal corresponds with the alignment of the patterned features and the asperity direction of travel.

The precession rate, i.e., the rotational rate of the substrate relative to the carrier head, can be determined by detecting this signal and determining parameters of the periodic alignment signal.

Figure 1:
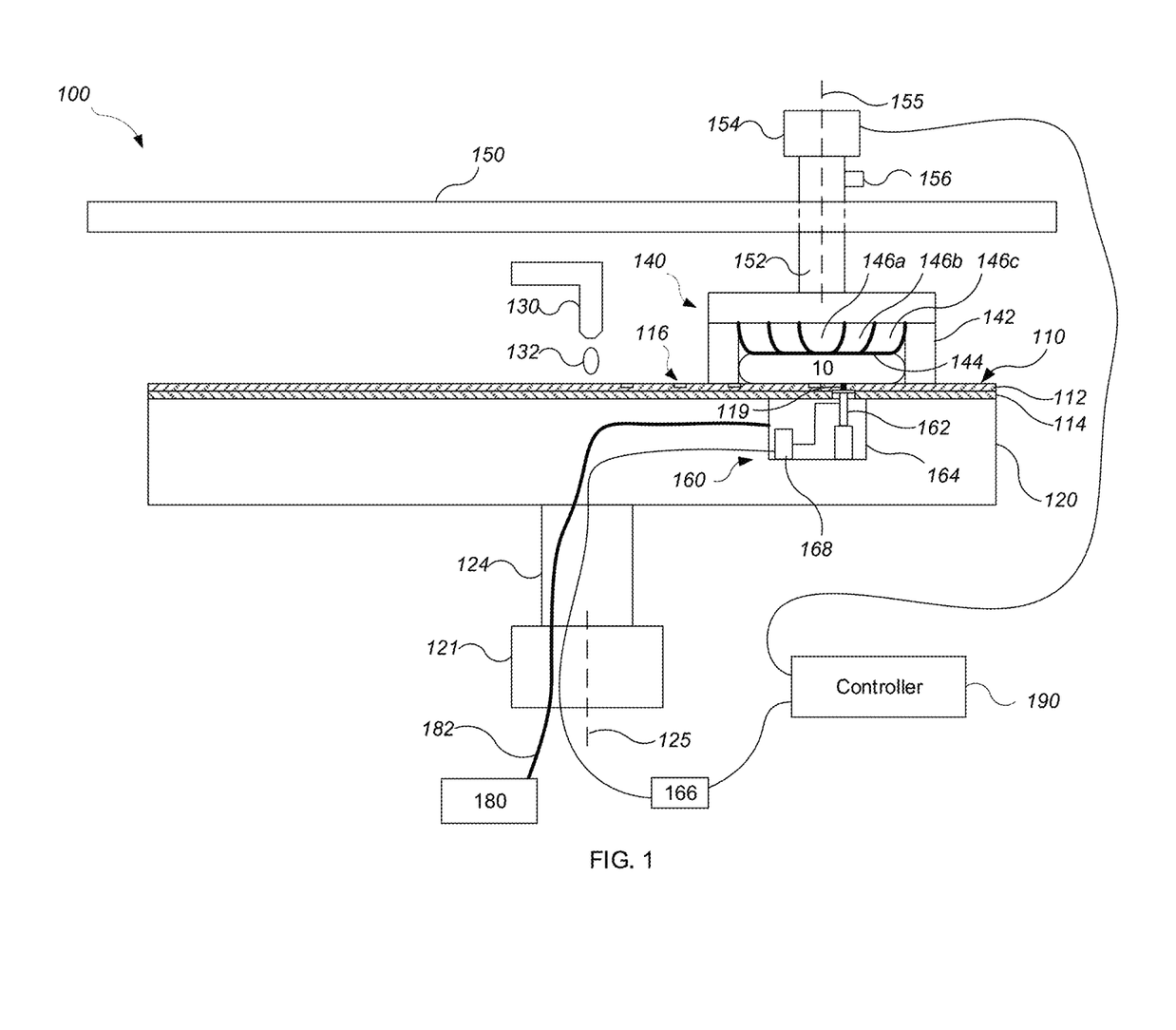
FIG. 1 illustrates a schematic cross-sectional view of an example polishing apparatus.

FIG. 1 illustrates an example of a polishing apparatus 100. The polishing apparatus 100 includes a rotatable disk-shaped platen 120 on which a polishing pad 110 is situated. The polishing pad 110 can be a two-layer polishing pad with an outer polishing layer 112 and a softer backing layer 114. The platen is operable to rotate about an axis of rotation 125. For example, a motor 121, e.g., a DC induction motor, can turn a drive shaft 124 to rotate the platen 120.

The polishing apparatus 100 can include a port 130 to dispense polishing liquid 132, such as abrasive slurry, onto the polishing pad 110 to the pad. The polishing apparatus can also include a polishing pad conditioner to abrade the polishing pad 110 to maintain the polishing pad 110 in a consistent abrasive state.

The polishing apparatus 100 includes a carrier head 140 operable to hold a substrate 10 against the polishing pad 110. The carrier head 140 can include a retaining ring 142 to retain the substrate 10 below a flexible membrane 144. The carrier head 140 also includes one or more independently controllable pressurizable chambers defined by the membrane, e.g., three chambers 146a-146c, which can apply independently controllable pressurizes to associated zones on the flexible membrane 144 and thus on the substrate 10. Although only three chambers are illustrated in FIG. 1 for ease of illustration, there could be one or two chambers, or four or more chambers, e.g., nine to thirteen chambers. In addition, although FIG. 1 illustrates the chambers as radially arranged, as shown in FIG. 2B the carrier head can include multiple chambers, e.g., chambers 146a-f, distributed angularly around a center axis of the carrier head. This permits angular variation in the applied pressure in order to compensate for polishing asymmetry.

The carrier head 140 is suspended from a support structure 150, e.g., a carousel or track, and is connected by a drive shaft 152 to a carrier head rotation motor 154, e.g., a DC induction motor, so that the carrier head can rotate about an axis 155. Optionally each carrier head 140 can oscillate laterally, e.g., on sliders on the support structure 150, or by rotational oscillation of the carousel itself, or by sliding along the track. In typical operation, the platen is rotated about its central axis of rotation 125, and each carrier head is rotated about its central axis 155 and translated laterally across the top surface of the polishing pad.

A controller 190, such as a programmable computer, is connected to the motors 121, 154 to control the rotation rate of the platen 120 and carrier head 140. For example, each motor can include an encoder, e.g., a motor encoder, that measures the rotation rate of the associated drive shaft. A feedback control circuit, which could be in the motor itself, part of the controller, or a separate circuit, receives the measured rotation rate from the encoder and adjusts the current supplied to the motor to ensure that the rotation rate of the drive shaft matches at a rotation rate received from the controller. The encoder can also provide the orientation of the drive shaft and associate component, e.g., an encoder 156 for the drive shaft 152 can be used to determine the angular orientation of the carrier head 140.

The polishing apparatus 100 includes at least one in-situ acoustic monitoring system 160. The in-situ acoustic monitoring system 160 includes one or more acoustic signal sensors 162 installed at one or more locations on the upper platen 120.

A position sensor, e.g., an optical interrupter connected to the rim of the platen or a rotary encoder, can be used to sense the rotational position of the platen 120. This permits only portions of the signal measured when the sensor 162 is in proximity to the substrate 10, e.g., when the sensor 162 is below the carrier head 140 or substrate 10.

In the implementation shown in FIG. 1, the acoustic monitoring system 160 includes an acoustic sensor 162 positioned supported by the platen 120 to receive acoustic signals through the polishing pad 110 from the substrate 10. The acoustic sensor 162 can be partially or entirely in a recess 164 in the top surface of the platen 120. In some implementations, a top surface of the acoustic sensor 162 is coplanar with the top surface of the platen 120.

In some implementations, the portion of the polishing pad directly above the acoustic sensor 162 can include an acoustic window 119, e.g., a region having lower acoustic impedance than the surrounding polishing material. The acoustic window 119 can extend through the polishing layer 112, or the backing layer 114, or both. However, if the acoustic transmission of the polishing pad is sufficiently high, the acoustic window 119 may not be necessary.

The acoustic sensor 162 is a contact acoustic sensor having a surface connected to (e.g., in direct contact with, or having just an adhesive layer for attachment to, or having just an acoustic gel for transmission of the acoustic signal from) a portion of the polishing layer 112, or the backing layer 114, or the acoustic window 119. For example, the acoustic sensor 162 can be an electromagnetic acoustic transducer or piezoelectric acoustic transducer. A piezoelectric sensor can include a rigid contact plate, e.g., of stainless steel or the like, which is placed into contact with the body to be monitored, and a piezoelectric assembly, e.g., a piezoelectric layer sandwiched between two electrodes, on the backside of the contact plate. The acoustic sensor 162 can be connected by circuitry 168 to a power supply and/or other signal processing electronics 166 through a rotary coupling, e.g., a mercury slip ring.

In some implementations, the in-situ acoustic monitoring system 160 is a passive acoustic monitoring system. In this case, signals are monitored by the acoustic sensor 162 without generating signals from an acoustic signal generator (or the acoustic signal generator can be omitted entirely from the system). The passive acoustic signals monitored by the acoustic sensor 162 can be in 20 kHz to 1 MHz range, e.g., 20 to 50 kHz, or 200 to 400 kHz, or 200 KHz to 1 MHz, depending on application. For example, for monitoring of polishing of inter-layer dielectric (ILD) in a shallow trench isolation (STI), a frequency range of 225 kHz to 350 kHz can be monitored.

The signal from the sensor 162 can be amplified by a built-in internal amplifier. In some implementations, the amplification gain is between 40 and 90 dB (e.g., 50 dB or 80 dB). The signal from the acoustic sensor 162 can then be further amplified and filtered if necessary, and digitized through an A/D port to a high speed data acquisition board, e.g., in the electronics 166. Data from the acoustic sensor 162 can be recorded at a similar range as that of the generator 163 or at a different, e.g., higher, range, e.g., from 1 to 10 MHz, e.g., 1-3 MHz or 6-8 MHz. In implementations in which the acoustic sensor 162 is a passive acoustic sensor, a frequency range from 100 kHz to 2 MHz can be monitored, such as 500 kHz to 1 MHz (e.g., 750 kHz).

If positioned in the platen 120, the acoustic sensor 162, can be located at the center of the platen 120, e.g., at the axis of rotation 125, at the edge of the platen 120, or at a midpoint (e.g., 5 inches from the axis of rotation for a 20 inch diameter platen).

Figure 2A:
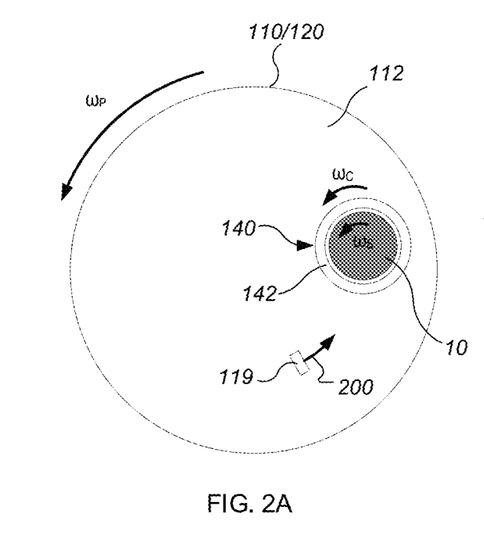
FIG. 2A illustrates a top view of the polishing pad upper surface atop the platen and a carrier head retaining a substrate.
Figure 2B:
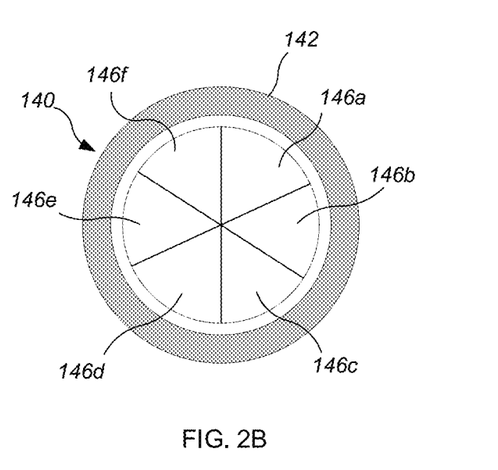
FIG. 2B illustrates a bottom view of a carrier head.

Referring now to FIG. 2A, a top-down view of the polishing pad 110 atop the platen 120 is shown. The substrate 10 is retained within the retaining ring 142 of the carrier head 140. The controller 190 commands the carrier head 140 to cause the chambers 146a-146c (see FIG. 1) to press the substrate 10 into contact with the polishing layer 112.

As the carrier head 140 presses the substrate 10 against the polishing layer 112, the carrier head 140 rotates around the central axis 155 at a carrier head rotation rate $\omega_C$. The substrate 10 is restrained to the area beneath the carrier head 140 by the retaining ring 142 and can move, e.g., rotate, within the enclosed area. In particular, the friction between the substrate and the inner surface of the retaining ring 142 and/or friction of the membrane 144 against the substrate 10 induces rotation in the substrate 10 at a substrate rotational rate, $\omega_S$. The substrate rotational rate, $\omega_S$, can be approximately, but typically not exactly, the same rotational rate $\omega_C$. of the carrier head 140. The difference between the rotation rate $\omega_C$ of the carrier head and the rotation rate provides the precession rate.

The platen 120 includes the acoustic window 119 in contact with the acoustic sensor 162 beneath. The acoustic sensor 162 is stationary within the recess 164 of the platen 120 while the platen 120 rotates with platen rotational rate, $\omega_P$, and travels in a common direction of travel 200 with the rotation of the plate 120. This sweeps the acoustic window 119 and associated acoustic sensor 162 beneath the substrate 10 within the retaining ring 142.

Figure 3A:
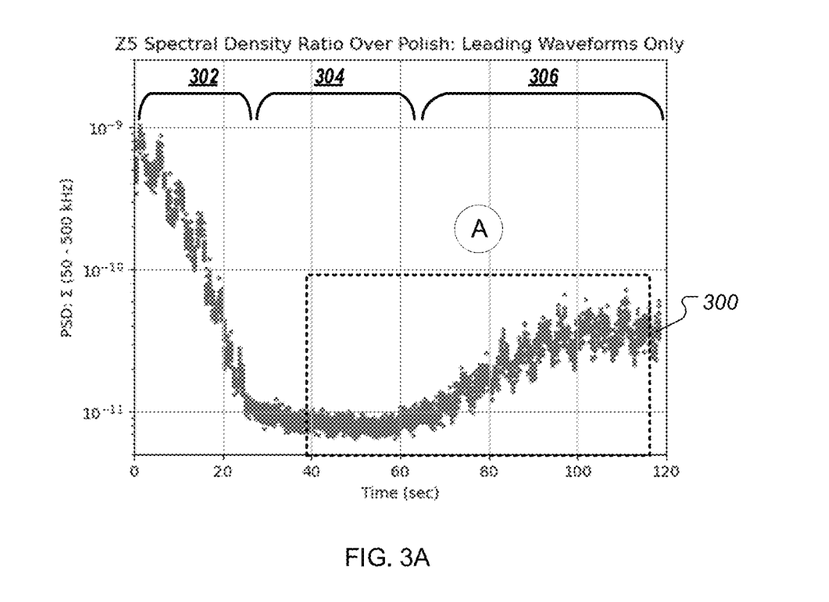
FIG. 3A is a graph showing an exemplary acoustic signal.

The acoustic sensor 162 receives an acoustic signal based on the received acoustic information from the interface between the substrate 10 and the pad 110. FIG. 3A depicts an exemplary acoustic signal 300 generated during a polishing process. The acoustic signal 300 compares the summed power spectral density (PSD) across a frequency range on the y-axis against time, in seconds (s). The acoustic signal 300 has distinct regions, such as first region 302, second region 304, and third region 306 corresponding to layer transitions of the substrate 10.

Without wishing to be bound by theory, a layer transition occurs when layer topography has been removed by the apparatus 100. In some implementations, the regions 302, 304, and 306 correspond to layer transitions in the substrate 10. The polishing of topography of the substrate 10 may corresponds to a first region 302 of the signal 300 in FIG. 6. In the second region 304 of the signal 300 the acoustic signal 300 is substantially constant (albeit subject to noise). The polishing of a planar surface may correspond to a second region 304 of the acoustic signal 300. The second region 304 continues in time until the filler layer extending above a patterned layer has been removed.

The patterned layer is composed of a different material, e.g., dielectric, than the filler layer and interacts with the polishing layer 112 surface and materials differently, thereby creating a third region 306 of the acoustic signal 300. In addition, continued polishing can create dishing, and this topology may again increase the acoustic signal. The third region 306 is not constant, e.g., can be increasing or decreasing.

Figure 3B:
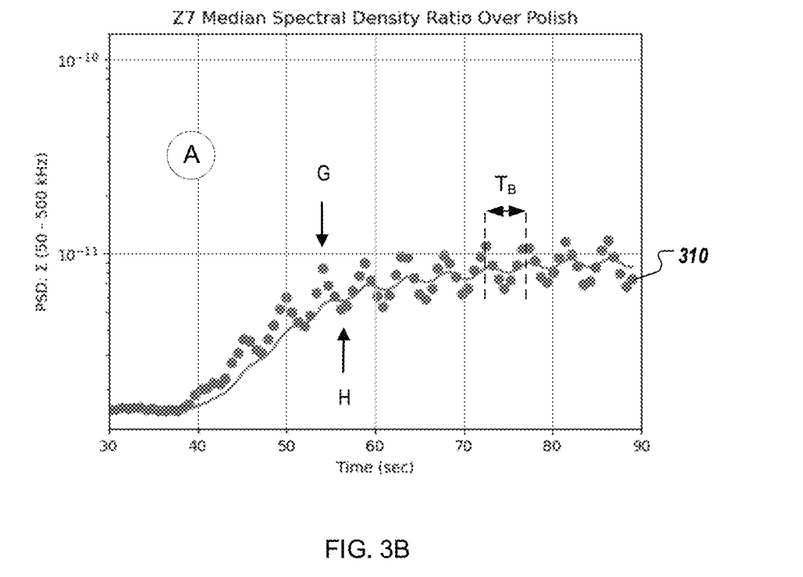
FIG. 3B is an exploded view of a portion of the acoustic signal of FIG. 3A.

An expanded view of third region 306, enclosed by box A, is depicted in FIG. 3B. The acoustic signal 310 of FIG. 3B has undergone further processing (e.g., averaging) to reduce noise, e.g., to denoise, in the acoustic signal 300. In other examples, the denoising process can include the application of sub-sampling, averaging, binning, or windowing to the received acoustic signals.

Without wishing to be bound by theory, each data point of acoustic signal 310 corresponds to a different instance in which the platen 120 sweeps the acoustic sensor 162 beneath the substrate 10. Between each data point, the platen 120 undergoes a full rotation during which the acoustic sensor 162 is not beneath the substrate 10. The data points of acoustic signal 310 depict a periodic motion oscillating on the y-axis with time, between a maximum (G) and a minimum (H). Without wishing to be bound by theory, in some implementations, the maximum (G) and minimum (H) correspond to structural features of the patterned layer, and in particular to parallel or perpendicular alignment of the features with respect to the direction of motion of the polishing pad below the substrate.

The patterned layer of the substrate 10 is a non-uniform surface including circuitry dies forming a complex pattern of dielectric plateaus and conductor-filled trenches. The dies can be rectangular in shape, e.g., a rectangle, a square, and arranged in a regular array on the semiconductor layer. The dies being arranged in the array form a series of parallel register lines, e.g., edges of the dies or scribe lines between the dies, along the faces of the rectangular dies.

Figure 4A:
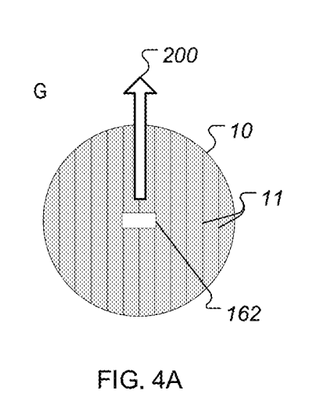
FIGS. 4A and 4B illustrate exemplary orientations of a substrate having parallel register lines with respect to a direction of travel of an acoustic sensor.
Figure 4B:
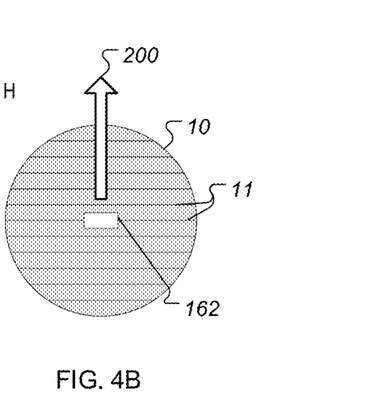

FIGS. 4A and 4B depict the substrate 10 having a regular arrangement of parallel register lines 11 in two respective orientations with respect to the movement of an acoustic sensor 162. The spacing of the register lines 11 is exemplary. The acoustic sensor 162 is shown sweeping beneath the substrate 10 along a direction of travel 200. The direction of travel 200 is an approximation of the relative motion of the acoustic sensor 162 as the platen 120 sweeps the acoustic sensor 162 beneath the substrate 10. In some implementations, the acoustic monitoring system 160 is configured to generate a measurement at each pass of the acoustic sensor 162 beneath the substrate 10, e.g., as the acoustic sensor 162 passes across the diameter of the substrate 10. In this manner acoustic signal 310 is a sequence of measurements generated at a sampling rate that corresponds to the rotation rate $\omega_P$, of the platen 120. The sampling rate corresponds to the time interval between sequential measurements of the acoustic signal 310, e.g., the sampling rate corresponds with $\omega_P$.

In some implementations, the acoustic monitoring system 160 is configured to generate a single measurement at each pass at a point along the diameter of the substrate 10. In alternative implementations, the acoustic monitoring system 160 is configured to generate multiple measurements at each pass at points spanning the diameter of the substrate 10. In such implementations, the acoustic monitoring system 160 can process the multiple generated measurements into an averaged measurement in the sequence of measurements of acoustic signal 310.

FIG. 4A illustrates the register lines 11 aligning in parallel with the direction of travel 200 while FIG. 4B illustrates the register lines 11 aligning perpendicular with the direction of travel 200. In general, the orientation of the register lines 11 relative to the direction of motion 200 will change as the platen 120 and substrate 10 rotate independently.

The asperities of the polishing layer 112 sweeping beneath the substrate 10 along the direction of travel 200 create friction on the contacting surface of the substrate 10 and remove a portion of the substrate 10 material contacting the pad 110. However, the respective alignments of the register lines 11 with the direction of travel 200 shown in FIGS. 4A and 4B generate different acoustic signals received by the acoustic sensor 162. Said another way, the arrangement of the acoustic window 119 and substrate 10 of FIG. 4A in which the register lines 11 are parallel with the direction of travel 200 produces a first acoustic signal magnitude. The arrangement of FIG. 4B in which the register lines 11 are perpendicular with the direction of travel 200 produces a second acoustic signal magnitude.

For example, in some implementations, the arrangement of FIG. 4A corresponds with the signal maxima (e.g., maximum G), and the arrangement of FIG. 4B corresponds with the signal minima (e.g., minimum H). Between the periodic maxima and minima, e.g., G and H, the acoustic signal 310 consists of a sequence of measurement values, e.g., points of FIG. 3B, each of which correspond to generated measurements at various angular orientations of the substrate 10.

As the acoustic window 119 sweeps beneath the substrate 10 at regular intervals given by $\omega_P$, the substrate 10 will be at an angular orientation with respect to the direction of travel 200. The platen 120 and the substrate 10 within the retaining ring 142 rotate at two rotational velocities, $\omega_P$, and $\omega_S$. The acoustic sensor 162 receives acoustic signals from the interface of the polishing layer 112 and the substrate 10 when the acoustic window 119 is beneath the substrate 10. When the acoustic sensor 162 is not beneath the substrate 10, no signal is received from the interface.

Without wishing to be bound by theory, as the platen 120 rotates at the rotational speed W P the acoustic monitoring system 160 generates acoustic measurements at the sampling rate, described above. Between measurements, the substrate 10 rotates by a rotational distance, $\Delta\theta_S \propto (\omega_S - \omega_P)/2\pi$. FIGS. 5A through 5E illustrates the substrate 10 including the parallel register lines 11 at an exemplary sequence of angular orientations corresponding to measurements of the acoustic signal 310 collected at the sampling rate.

Figure 5A:
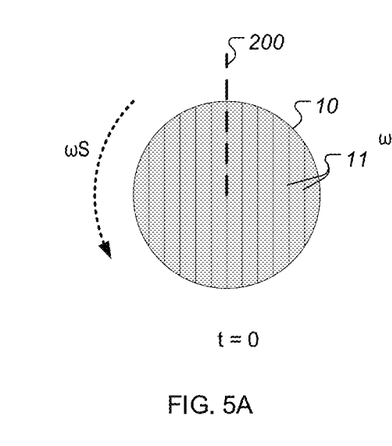
FIGS. 5A-5E illustrate exemplary angular orientations of an exemplary substrate from a direction of travel of the acoustic sensor of FIG. 2.

The angular orientation of FIG. 5A can correspond, in some implementations, to the signal maxima, G, of FIG. 3B and orientation shown in FIG. 3B as the register lines 11 and the direction of travel 200 are parallel. The substrate 10 rotates at rotational speed, $\omega_S$, and the acoustic sensor 162 receives acoustic signals at the sampling rate. In the examples of FIGS. 5A to 5E, $\omega_S > \omega_P$ which results in a positive (e.g., counter-clockwise) $\Delta\theta_S$. At each measurement, e.g., taken at a time of an integer value of the sampling rate, r, the $\Delta\theta_S$ is increased as the substrate 10 processes.

Figure 5B:
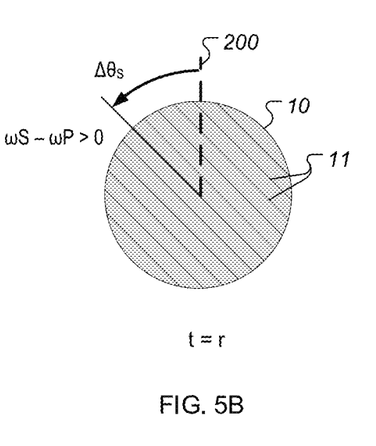
Figure 5C:
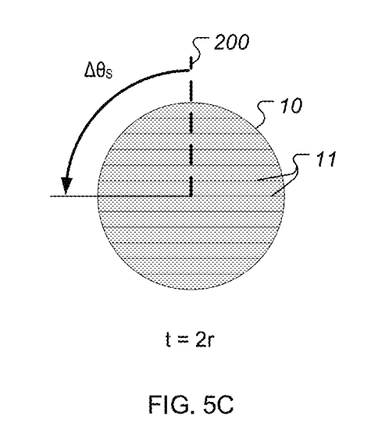
Figure 5D:
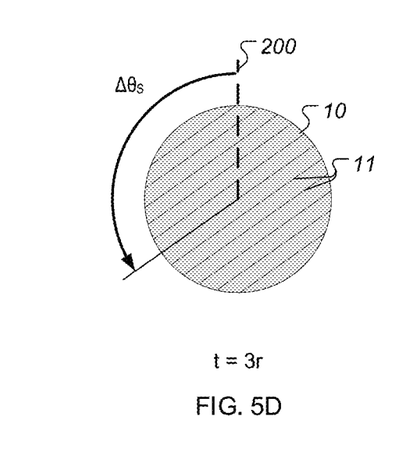

As the substrate 10 processes through the orientations depicted in FIGS. 5B to 5D, the received acoustic signal changes according to $\Delta\theta_S$ corresponding to the acoustic signal 310 changes between maximum, G, and minimum, H.

Figure 5E:
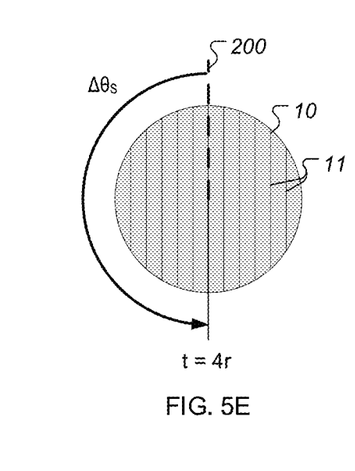

In FIG. 5E, the register lines 11 are parallel with the direction of travel 200 and the measured signal, such as acoustic signal 310, is returned to the acoustic signal magnitude of FIG. 5A. As such, the examples of FIGS. 5A to 5E illustrate one exemplary periodic fluctuation of acoustic signal 310.

Referring again to FIG. 3B, controller 190 receives the acoustic signal 310 and processes the measurements to determine one or more parameters of the acoustic signal 310. For example, the controller 190 processes the received acoustic signal 310 and calculates frequency of oscillation, $F_B$, of acoustic signal 310. For example, a sinusoidal or similar function can be fit to the sequence of values in the acoustic signal 310, and the frequency of oscillation $F_B$ can be the frequency of the function resulting from the fitting. The determined parameters of the acoustic signal 310 can be used to obtain characteristics of the orientation of the substrate 10, e.g., rotation rate estimate ($\omega_S$) a variance of the rotation rate estimate, and a rotational orientation ($\theta_S$).

The controller 190 determines the substrate rotation rate and a continuous time-varying function representing the substrate 10 orientation through time, e.g., $\theta_S(T)$, based on the determined parameters. In particular, assuming that the platen, carrier head and substrate rotation rates are not vastly different, e.g., by greater than a factor of two, then as shown by FIGS. 5A-5E the frequency of oscillation, $F_B$, should be twice the beat frequency. Assuming, the platen rotates faster than the carrier head, and the carrier head rotates faster than the substrate, then $\omega_P > \omega_P$. Thus, the beat frequency should be $(\omega_P - \omega_S) = F_B/2$. So the substrate rotation rate can be calculated as $\omega_S = \omega_P - F_B/2$. The precession rate can be calculated as $\omega_S - \omega_C$. Thus, orientation of the substrate relative to the carrier head can be calculated as a function of time T, e.g., as a function including $(\omega_S - \omega_C)*T$. Using this data, the appropriate chamber 146a-i that overlies a given angular region of the substrate can be calculated over time, and pressures can be selected over time in order to reduce asymmetric polishing.

In addition, the orientation of the substrate can be periodically measured based on the acoustic signal, and the measured orientation can be used to compensate for potential discrepancy between the actual precession and calculated precession. In general, the peaks and/or valleys should correspond to specific orientations of the substrate relative to the direction of motion. The specific orientation(s) of the substrate that correspond to peaks and/or valleys can be determined empirically, e.g., by loading a substrate with known orientation into the carrier head before polishing and then monitoring the acoustic signal during a test polishing operation. The orientation of the substrate can be represented as an angle θ between the direction of motion 200 and a notch or flat 14 on an edge 12 of the substrate 10. Assuming the correspondence between peaks and angular orientations are known, the angular difference between the carrier head and substrate can be periodically reset.

Figure 6:
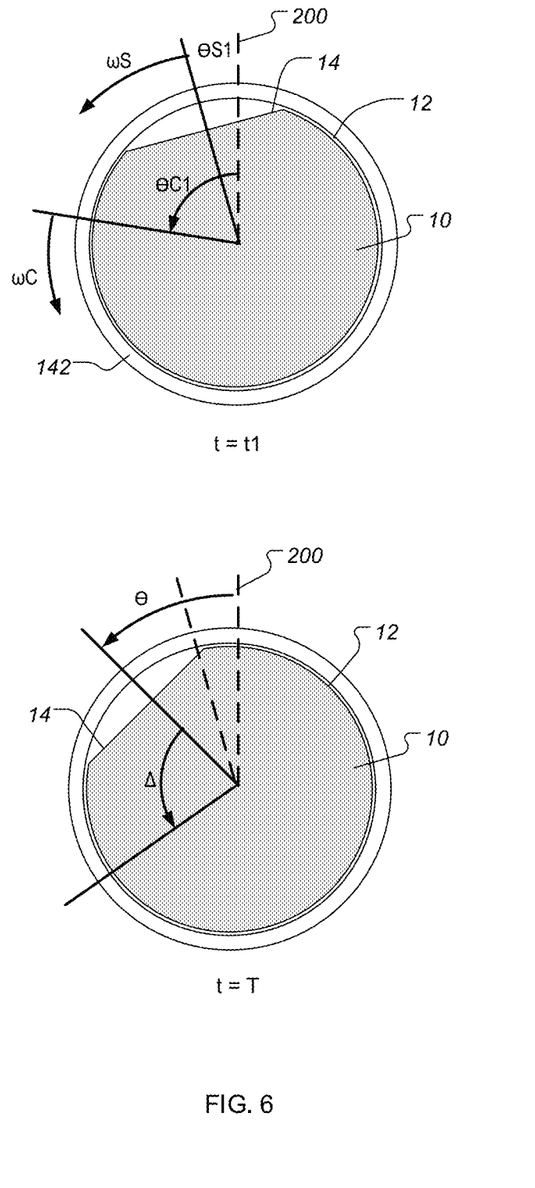
FIG. 6 illustrates exemplary angular orientations of an exemplary substrate having a flat.

For example, referring to FIG. 6, suppose that an indication in the acoustic signal, e.g., a peak, indicates that the substrate is at an orientation $\theta_{S1}$ (the peaks or valleys may correspond to die alignment of the die edges with the direction of motion, in which case then $\theta_{S1}$ would typically be 0° or 90°). Assuming that the controller detects the presence of a peak at time t1, the controller can then calculate the orientation of the substrate as $\theta = \theta_{S1} + \omega_S*(T-t1)$. In addition, the controller can capture the carrier head orientation $\theta_{C1}$, at time t1, e.g., from motor encoder data. In this case, the controller can calculate the precession Δ, i.e., the difference between the carrier head orientation and substrate orientation, as $\Delta = (\theta_{S1} - \theta_{C1}) + (\omega_S - \omega_C)*(T-t1)$. The controller can then intermittently reset the calculation of the precession, obtaining new values for t1, $\theta_{S1}$, and $\theta_{C1}$, based on a more recently detected peak. Although the discussion above focuses on a peak as the indication, the technique could also be used with other indications, such as a valley, mid-line crossing, or inflection point. Calculation of the precession can be reset periodically, e.g., about once every 1 to 10 seconds, or each time the precession Δ exceeds a set value, e.g., 90° or 180° or 360°.

In some implementations, an initial angle of orientation between the substrate 10 and the carrier head 70 can be measured before polishing commences. For example, the initial orientation can be measured at a transfer station.

Figure 7:
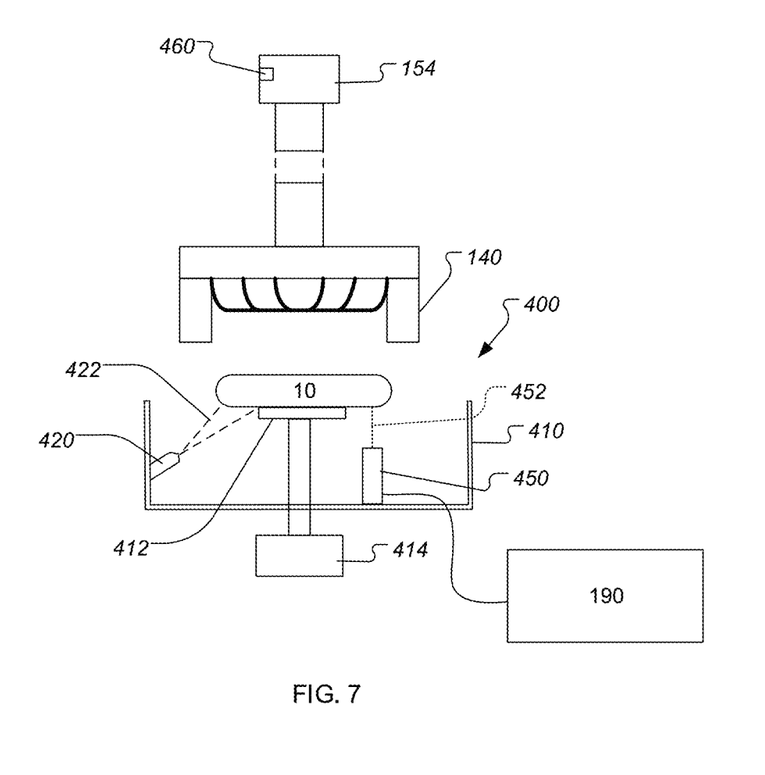
FIG. 7 illustrates a schematic cross-sectional view of a loading station.

Referring to FIG. 7, the substrate can be loaded into the carrier head 140 at a transfer station 400 that includes a loading cup 410. The loading cup 410 can include a support 412, such as a pedestal, lift pins, or an edge support ring, to hold the substrate 10 before being loaded into and/or after being unloaded from the carrier head 140. The support 412 can be rotatable and/or vertically actuatable, e.g., by a motor 414. The loading cup 410 can also include one or more nozzles 420 to spray a cleaning fluid 422, e.g., deionized water, on substrate 10 as the substrate sits on the support 412 and/or is held by the carrier head 140 at transfer station 400.

The transfer station 400 also includes a sensor 450, e.g., an optical sensor, to determine the substrate orientation, e.g., angle relative to the load cup 410. For example, the sensor 450 can generate a light beam 452 that is directed to an edge of the substrate 10 as the substrate sits on the support 412, and detect reflections of the light beam from the substrate 10. The support 412 can rotate; the notch or flat will generate a different reflected light intensity, so the controller can determine the initial substrate orientation Oso based on a signal from the sensor 450. An initial angular orientation $\theta_{C0}$ of the carrier head 140, e.g., relative to the load cup, can also be measured when the carrier head is lowered or the substrate is raised to be chucked to the carrier head 140. For example, the angular orientation of the carrier head can be monitored by a motor encoder 460 that is part of the motor 154.

Alternatively, the angular orientation of the substrate 10 could be measured after the substrate 10 is loaded onto the carrier head. For example, the sensor 450 could direct the light beam 452 onto the substrate 10 when the substrate is being held by the carrier head 140, and the motor 154 can rotate the carrier head 140 for the controller to detect the notch and thus initial substrate orientation. For this, the initial angular orientation $\theta_{C0}$ of the carrier head 140 can be the orientation at which the substrate is at the initial orientation $\theta_{C0}$, e.g., the notch is aligned with the light beam.

With these measurements, the controller 190 can calculate an initial angular difference $\Delta_0$, as $\Delta_0 = \theta_{S0} - \theta_{C0}$. Thereafter, during polishing the angular difference can be calculated based on the precession rate determined from the acoustic signal as discussed above, i.e., $\Delta = \Delta_0 + (\omega_S - \omega_C)*(T - t0)$, where t0 is the time that the substrate is lowered into contact with the rotating platen. The controller 190 can also intermittently reset the calculation of the precession as discussed above, obtaining new values for t1, $\theta_{S1}$, and $\theta_{C1}$, based on a more recently detected peak.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A chemical mechanical polishing system, comprising:
polishing station including a platen to support a polishing pad;
a rotatable carrier head to hold a surface of a substrate against the polishing pad;
a motor to generate relative motion between the platen and the carrier head so as to polish an overlying layer on the substrate;
an in-situ acoustic monitoring system comprising an acoustic sensor that receives acoustic signals from the surface of the substrate; and
a controller configured to determine a rate of change of angular orientation of the substrate based on received acoustic signals from the in-situ acoustic monitoring system, to obtain a rotation rate of the carrier head, and to determine a difference in angular orientation between the substrate and the carrier head based on the rate of change of angular orientation of the substrate and the rotation rate of the carrier head.

2. The system of claim 1, wherein the controller is configured to determine the difference in angular orientation based on the rate of change of angular orientation of the substrate, the rotation rate of the carrier head, a starting angular orientation of the substrate, and a starting angular orientation of the carrier head.

3. The system of claim 2, wherein the starting angular orientation of the substrate is an initial angular orientation of the substrate before polishing.

4. The system of claim 3, further comprising a transfer station including a sensor that generates a signal that depends on an angular orientation of the substrate, and wherein the controller is configured to receive a signal from the sensor in the transfer station and determine the initial angular orientation of the substrate on the signal.

5. The system of claim 4, wherein controller is configured to obtain the starting angular orientation of the carrier head as an angular orientation of the carrier head when the substrate is loaded into the carrier head at the transfer station.

6. The system of claim 4, wherein the controller is configured to obtain the starting angular orientation of the carrier head as an angular orientation of the carrier head at the transfer station while the substrate is loaded in the carrier head and the angular orientation of the substrate is being determined.

7. The system of claim 2, wherein the starting angular orientation of the substrate is an angular orientation of the substrate during polishing.

8. The system of claim 7, wherein the controller is configured to determine the angular orientation of the substrate during polishing from the acoustic signals.

9. The system of claim 8, wherein the controller is configured to obtain an indication in the acoustic signals which indicates an angular orientation of the substrate, the indication being a peak, valley, mid-line crossing, or inflection point of the signal, to detect the indication in the acoustic signals, and to set the starting angular orientation to the angular orientation.

10. The system of claim 9, wherein the controller is configured to repeatedly detect the indication in the acoustic signals, and to repeatedly reset the starting angular orientation to the angular orientation.

11. The system of claim 10, wherein the controller is configured to reset the starting angular orientation every 1 to 10 seconds.

12. The system of claim 10, wherein the controller is configured to reset the starting angular orientation each time the difference in angular orientation between the substrate and the carrier head exceeds a set value.

* * * * *